US012292628B2

(12) United States Patent
Sakurai

(10) Patent No.: US 12,292,628 B2
(45) Date of Patent: May 6, 2025

(54) DISPLAY MEDIUM, DISPLAY ASSISTANCE MEDIUM, PROCESSING DEVICE, PROGRAM, AND COMPUTER-READABLE RECORDING MEDIUM WHERE PROGRAM IS RECORDED

(71) Applicant: DWANGO Co., Ltd., Tokyo (JP)

(72) Inventor: Kaisei Sakurai, Tokyo (JP)

(73) Assignee: DWANGO Co., Ltd., Tokyo (JP)

( * ) Notice: Subject to any disclaimer, the term of this patent is extended or adjusted under 35 U.S.C. 154(b) by 307 days.

(21) Appl. No.: 17/908,995

(22) PCT Filed: Jun. 18, 2021

(86) PCT No.: PCT/JP2021/023236
§ 371 (c)(1),
(2) Date: Sep. 2, 2022

(87) PCT Pub. No.: WO2021/261404
PCT Pub. Date: Dec. 30, 2021

(65) Prior Publication Data
US 2023/0099123 A1    Mar. 30, 2023

(30) Foreign Application Priority Data
Jun. 26, 2020    (JP) .................................. 2020-110274

(51) Int. Cl.
G02F 1/13      (2006.01)
G02F 1/1335    (2006.01)

(52) U.S. Cl.
CPC ...... G02F 1/1323 (2013.01); G02F 1/133512 (2013.01); G02F 1/133553 (2013.01)

(58) Field of Classification Search
None
See application file for complete search history.

(56) References Cited

U.S. PATENT DOCUMENTS 4,483,087 A    11/1984    Stoyanov
2006/0012614 A1*    1/2006    Asao ................. G02F 1/133514
345/690

(Continued)

FOREIGN PATENT DOCUMENTS

JP    8-186680 A    7/1996
JP    10-315512 A   12/1998

(Continued)

OTHER PUBLICATIONS

Office Action issued on Mar. 5, 2024, in corresponding Japanese Application No. 2021-039158, 9 pages.

(Continued)

Primary Examiner — Ryan Crockett
(74) Attorney, Agent, or Firm — Maier & Maier, PLLC

(57) ABSTRACT

This display medium is formed so as to be capable of displaying a prescribed number of content items corresponding to a prescribed number of azimuth angles from prescribed elevation and azimuth angles. The display medium includes a planar member for reflecting light, the planar member being segmented into a plurality of unit cells, with each of the plurality of unit cells being segmented into a prescribed number of sub-cells corresponding to the prescribed number of azimuth angles. A protrusion member that has a light-shielding surface, parallel to the prescribed azimuth angle on the planar member, is formed in each sub-cell corresponding to the prescribed azimuth angle. The protrusion member is tinted with a plurality of colors that form an achromatic color by additive color mixing.

14 Claims, 6 Drawing Sheets

(56) References Cited

U.S. PATENT DOCUMENTS

| | | | | |
|---|---|---|---|---|
| 2013/0201501 A1* | 8/2013 | Nishikawa | ............... | H04N 1/54 |
| | | | | 358/1.9 |
| 2014/0354674 A1* | 12/2014 | Okamoto | ................. | G09G 5/02 |
| | | | | 345/590 |
| 2017/0098396 A1 | 4/2017 | Rubinstein | | |
| 2020/0349872 A1* | 11/2020 | Sakurai | ................... | G09F 13/22 |

FOREIGN PATENT DOCUMENTS

| | | | |
|---|---|---|---|
| JP | 2000-318144 | A | 11/2000 |
| JP | 2002099223 | A | 4/2002 |
| JP | 2017-154438 | A | 9/2017 |
| JP | 6374625 | B1 | 8/2018 |
| JP | 2019-133124 | A | 8/2019 |

OTHER PUBLICATIONS

International Search Report (with English Translation) and Written Opinion (with Machine Translation) issued on Aug. 31, 2021 in corresponding International Patent Application No. PCT/JP2021/023236; 10 pages.

Japanese Office Action (with Machine Translation) issued on Dec. 1, 2020 in corresponding Patent Application No. 2020-110274; 18 pages.

* cited by examiner (a)

(b)

(a)

(b)

DISPLAY MEDIUM, DISPLAY ASSISTANCE MEDIUM, PROCESSING DEVICE, PROGRAM, AND COMPUTER-READABLE RECORDING MEDIUM WHERE PROGRAM IS RECORDED

FIELD

The present invention relates to a display medium, a display assistance medium, a processing device, a program, and a computer-readable recording medium where a program is recorded.

BACKGROUND

There is a display medium for visually recognizing the color of a prescribed portion on a planar member by a protrusion member that is formed perpendicular to the planar member, parallel to a designated direction on the planar member, when seen from the designated direction (elevation and an azimuth angle) (refer to Patent Document 1). Accordingly, the display medium displays different content items in a plurality of designated directions. In Patent Document 1, the color of the protrusion member is a monochromatic color.

Patent Document

Patent Document 1: Japanese Patent No. 6,374,625

SUMMARY

However, in Patent Document 1, the color of the content displayed by the display medium may be affected by the color of the protrusion member. For example, in a case where the protrusion member is black, the color of the content displayed by the display medium becomes blackish, and in a case where the protrusion member is red, the color of the content becomes reddish. In a case where the shade of the content matches the shade of the protrusion member, the color of the protrusion member does not greatly affect the visibility of the content to be displayed. In order to improve the visibility of the content, it is necessary that there is no great difference in the shades of each of the content items displayed in each of the directions, and thus, the selection of the content is limited.

Accordingly, an object of the invention is to provide a display medium, a display assistance medium, a processing device, a program, and a computer-readable recording medium where a program is recorded that are consonant with arbitrary content.

In order to attain the object described above, a display medium of one aspect of the invention is a display medium capable of displaying a prescribed number of content items corresponding to a prescribed number of azimuth angles from prescribed elevation and azimuth angles, and includes a planar member for reflecting light, in which a planar member is segmented into a plurality of unit cells, each of the plurality of unit cells is segmented into a prescribed number of sub-cells corresponding to the prescribed number of azimuth angles, a protrusion member that has a light-shielding surface, parallel to the prescribed azimuth angle on the planar member, is formed perpendicular to the planar member in each sub-cell corresponding to the prescribed azimuth angle, and the protrusion member is tinted with a plurality of colors that form an achromatic color by additive color mixing.

An upper surface of the protrusion member may be segmented into a plurality of regions to which each color is applied when seen from a position facing the planar member, and different colors may be applied to adjacent regions in a vertical direction and a horizontal direction, and the same color may be applied to adjacent regions in an oblique direction.

When the protrusion member contains a UV curable ink sprayed by an ink jet printer, and each of the plurality of colors tinted on the protrusion member may be a primary color of the ink used in the ink jet printer.

The region may be formed by a plurality of times of spray of an ink jet printer.

A display medium of one aspect of the invention is a display medium capable of displaying a prescribed number of content items corresponding to a prescribed number of azimuth angles from prescribed elevation and azimuth angles, and includes a planar member for reflecting light, in which the planar member is segmented into a plurality of unit cells, each of the plurality of unit cells is segmented into a prescribed number of sub-cells corresponding to the prescribed number of azimuth angles, a protrusion member that has a light-shielding surface, parallel to the prescribed azimuth angle on the planar member, is formed perpendicular to the planar member in each sub-cell corresponding to the prescribed azimuth angle, and the protrusion member is formed in gray.

A display assistance medium of one aspect of the invention is a display assistance medium capable of being pasted to a display surface that has a flat surface for reflecting light and of displaying a prescribed number of content items corresponding to a prescribed number of azimuth angles from prescribed elevation and azimuth angles, and includes a sheet-shaped member that has a sheet shape and transmits light, in which the sheet-shaped member is segmented into a plurality of unit cells, each of the plurality of unit cells is segmented into a prescribed number of sub-cells corresponding to the prescribed number of azimuth angles, a protrusion member that has a light-shielding surface, parallel to the prescribed azimuth angle on the sheet-shaped member, is formed perpendicular to the sheet-shaped member in each sub-cell corresponding to the prescribed azimuth angle, and the protrusion member is tinted with a plurality of colors that form an achromatic color by additive color mixing.

A display assistance medium of one aspect of the invention is a display assistance medium capable of being pasted to a display surface that has a flat surface for reflecting light and of displaying a prescribed number of content items corresponding to a prescribed number of azimuth angles from prescribed elevation and azimuth angles, and includes a sheet-shaped member that has a sheet shape and transmits light, in which the sheet-shaped member is segmented into a plurality of unit cells, each of the plurality of unit cells is segmented into a prescribed number of sub-cells corresponding to the prescribed number of azimuth angles, a protrusion member that has a light-shielding surface, parallel to the prescribed azimuth angle on the sheet-shaped member, is formed perpendicular to the sheet-shaped member in each sub-cell corresponding to the prescribed azimuth angle, and the protrusion member is formed in gray.

A processing device of one aspect of the invention is a processing device used for manufacturing the display medium or the display assistance medium described above, and includes a color determination unit for determining a combination of colors in which the protrusion member forms an achromatic color by additive color mixing.

A processing device of one aspect of the invention is a processing device used for manufacturing the display medium or the display assistance medium described above, and includes an arrangement determination unit for determining arrangement of colors that form an achromatic color by additive color mixing such that the protrusion member appears in the achromatic color.

A processing program of one aspect of the invention is a processing program for allowing a computer to function as the processing device described above.

According to the invention, it is possible to provide a display medium, a display assistance medium, a processing device, a program, and a computer-readable recording medium where a program is recorded that are consonant with arbitrary content.

DETAILED DESCRIPTION

Figure 1:
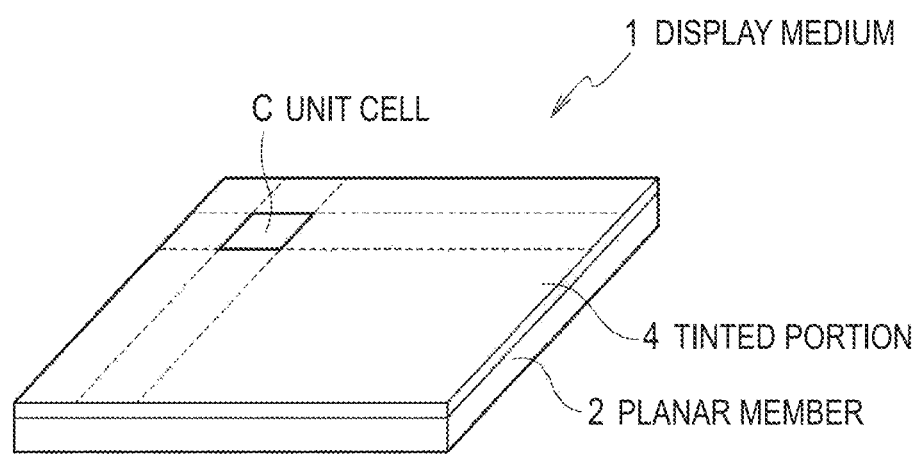
FIG. 1(a) is a perspective view of a display medium according to embodiments of the invention.
FIG. 1(b) is a perspective view of a unit cell.
Figure 1:
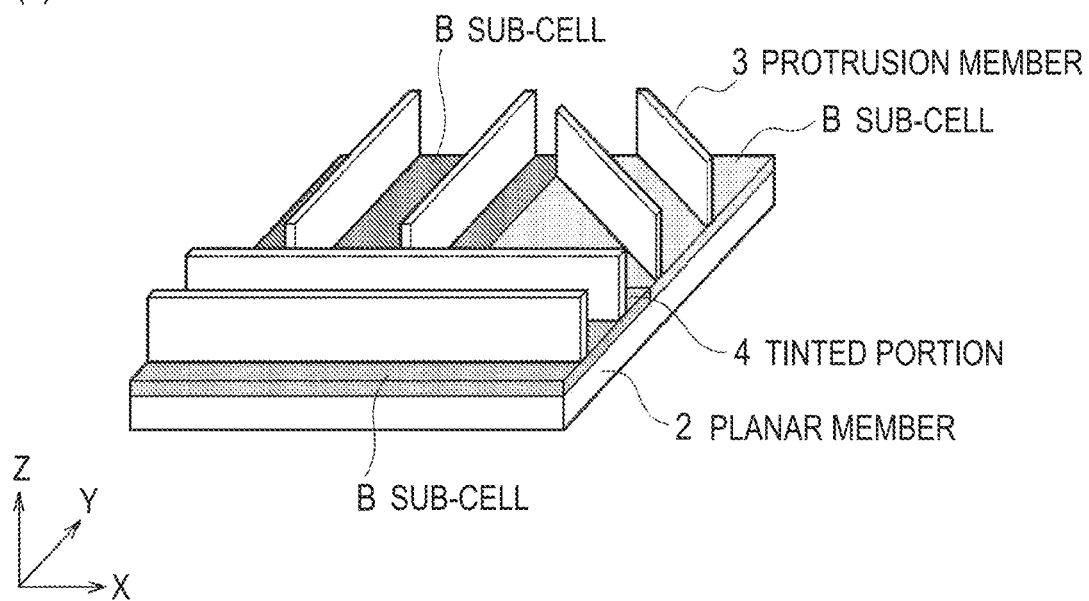

Next, embodiments of the invention will be described with reference to the drawings. In the description of the drawings, the same or similar reference numerals will be applied to the same or similar parts.

(Display Medium)

A display medium 1 according to embodiments of the invention will be described with reference to FIG. 1. The display medium 1 according to the embodiments of the invention is formed to be capable of displaying a prescribed number of content items corresponding to a prescribed number of azimuth angles from prescribed elevation and azimuth angles. The display medium 1 is capable of displaying the content by observing the display medium from the prescribed elevation to the prescribed azimuth angle, or is capable of displaying different content by changing the azimuth angle. The display medium 1 is capable of displaying a plurality of content items for each of the prescribed azimuth angles. In addition, the elevation when an observer observes the content may be different for each content item. In the embodiments of the invention, the content is a still image. Note that, in the embodiments of the invention, a direction in which the display medium 1 displays the content may be referred to as a designated direction.

As illustrated in FIG. 1(a), in the display medium 1, a tinted portion 4 is provided on a flat surface of a planar member 2. The planar member 2 has the flat surface for reflecting light. It is sufficient that the planar member 2 is capable of performing specular reflection or light diffusion. In addition, it is preferable that the planar member 2 contains a metal having a high specular component, from the viewpoint of improving visibility. The tinted portion 4 is a portion that is tinted with an ink.

As illustrated in FIG. 1(a), the flat surface of the planar member 2 is segmented into a plurality of unit cells C. In an example illustrated in FIG. 1, on the flat surface of the planar member 2, the plurality of unit cells are arranged in a vertical direction and a horizontal direction, respectively. Further, as illustrated in FIG. 1(b), each of the plurality of unit cells C is segmented into a prescribed number of sub-cells B corresponding to the prescribed number of azimuth angles.

Here, the unit cell C and the sub-cell B may be a virtual segment. For example, the boundary between the sub-cells B or the unit cells C may not be visualized in a case where the same color value is applied to two adjacent sub-cells B or in accordance with the arrangement of a protrusion member 3.

Note that, in the example illustrated in FIG. 1, a case is described in which the planar member 2 is a rectangular parallelepiped described, but it is sufficient that the planar member 2 has the flat surface, and the tinted portion 4 is provided on the flat surface. In addition, a case is described in which each of the unit cell C and the sub-cell B is in the shape of a rectangle, but the shape of the unit cell C and the sub-cell B is not limited.

The number of sub-cells B in one unit cell C corresponds to the number of content items that can be displayed by the display medium 1. For example, in the example illustrated in FIG. 1, one unit cell C is segmented into three sub-cells B, and thus, at least three content items can be displayed. The color of each portion corresponding to the portion of each of the sub-cells B, configuring content corresponding to the prescribed azimuth angle, is applied to each of the sub-cells B corresponding to the prescribed azimuth angle in the tinted portion 4.

As illustrated in FIG. 1(b), in each of the sub-cells B, the plate-shaped protrusion member 3 is arranged perpendicular to the planar member 2. In an example illustrated in FIG. 1(b), a case is described in which two protrusion members 3 are provided in each of the sub-cells B, but one protrusion member 3 may be provided in each of the sub-cells B, or three or more protrusion members 3 may be provided.

The protrusion member 3 has a light-shielding surface parallel to each of the prescribed number of azimuth angles on the planar member 2. The protrusion member 3 may include an opaque member for shielding light, but a part of light may be transmitted within a range not affecting the visibility of the observer. In each of the sub-cells B corresponding to the prescribed azimuth angle, the protrusion member 3 that has a surface parallel to the prescribed azimuth angle is formed.

In a case where a plurality of protrusion members 3 are provided in one sub-cell B, the protrusion members 3 are arranged parallel to each other. The protrusion member 3 is arranged in different directions for each sub-cell B in which the protrusion member 3 is provided, and the protrusion members 3 arranged in different sub-cells B are arranged not to be parallel to each other.

The display medium 1 according to the embodiments of the invention is observed at prescribed elevation. As illustrated in FIG. 1(b), the plate-shaped protrusion member 3 is provided perpendicularly on the flat surface of the planar member 2, and thus, when the display medium 1 is observed from the prescribed elevation, the tinted portion 4 that is not shielded by the protrusion member 3 is checked.

Note that, an area ratio of each of the sub-cells B in unit cell C and the shape of the protrusion member 3 are set such that at least one or more of (1) the amount of light of a prescribed sub-cell B seen from the prescribed azimuth angle that is shielded by the protrusion member 3, (2) the amount of light from a direction other than the prescribed direction or from a sub-cell B other than the prescribed sub-cell B, and (3) a standard deviation of reflection luminances of each of the sub-cells B decrease. The shape of each of the sub-cells B and the protrusion member 3 is specified by a method described in Patent Document 1.

Figure 2:
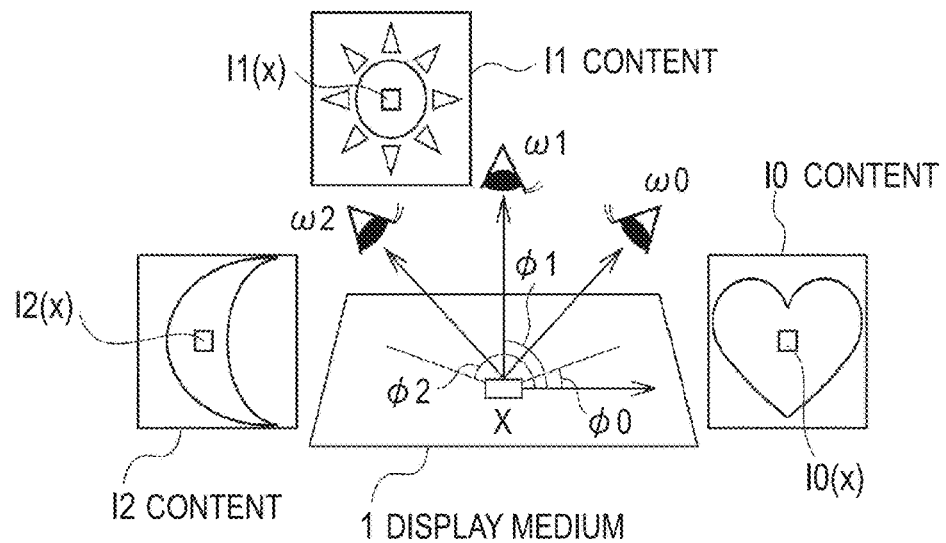
FIG. 2(a) is a diagram illustrating a relationship between an azimuth angle for observing content on the display medium and a protrusion member.
FIG. 2(b) is a diagram illustrating a relationship between an azimuth angle for observing content on the display medium and a protrusion member.
Figure 2:
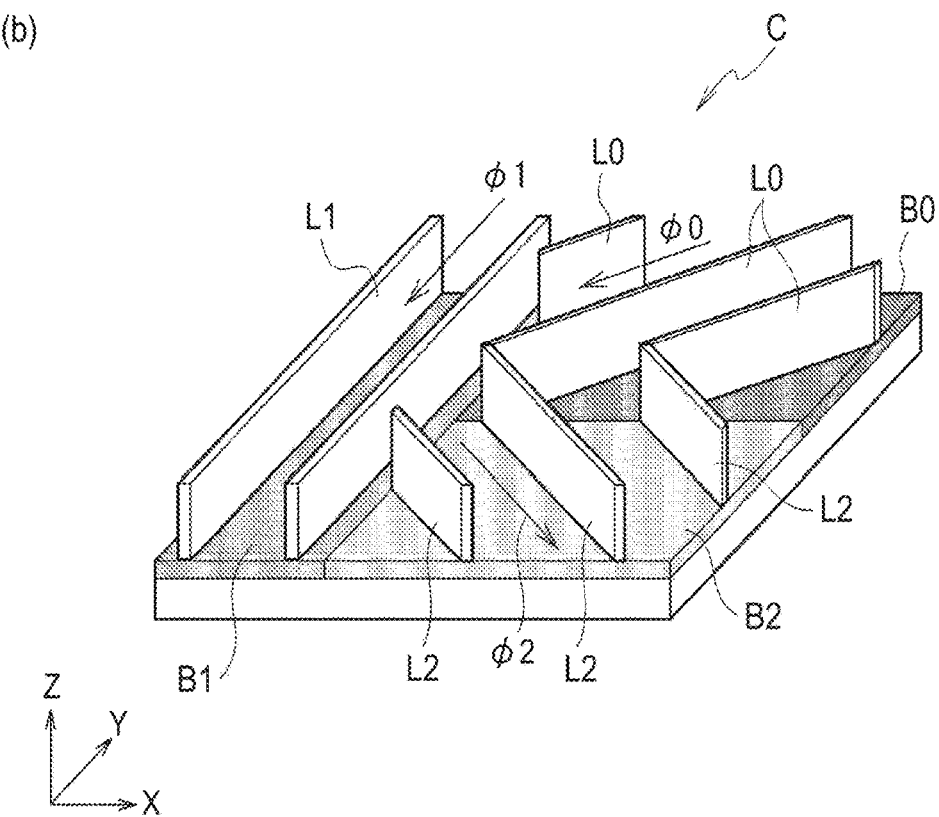

Each of elevation and an azimuth direction for observing the display medium 1 according to the embodiments of the invention will be described with reference to FIG. 2. FIG. 2(a) illustrates a case in which content items I0, I1, and I2 are displayed on the display medium 1.

In a case where a coordinate x on the display medium 1 is observed at prescribed elevation ω0 and an azimuth angle ϕ0, a color value of the coordinate of the content I0 corresponding to the coordinate x on the display medium 1 can be checked. Similarly, in a case where the coordinate x on the display medium 1 is observed at prescribed elevation ω1 and an azimuth angle ϕ1, a color value of the coordinate of the content I1 corresponding to the coordinate x on the display medium 1 can be checked. Further, in a case where the coordinate x on the display medium 1 is observed at prescribed elevation ω2 and an azimuth angle ϕ2, a color value of the coordinate of the content I2 corresponding to the coordinate x on the display medium 1 can be checked.

The unit cell C of the display medium 1 illustrated in FIG. 1(a), for example, is formed as illustrated in FIG. 2(b). The unit cell C includes a sub-cell B0, a sub-cell B1, and a sub-cell B2. Three protrusion members L0 parallel to the direction of the azimuth angle ϕ0 are arranged in the sub-cell B0. Two protrusion members L1 parallel to the direction of the azimuth angle ϕ1 are arranged in the sub-cell B1. Three protrusion members L2 parallel to the direction of the azimuth angle ϕ2 are arranged in the sub-cell B2.

In an example illustrated in FIG. 2(b), in a case where the unit cell C is observed from the direction of the azimuth angle ϕ0, the color of the tinted portion 4 of the sub-cell B0 is seen, and the protrusion member L0 arranged in the sub-cell B0, the protrusion member L1 arranged in the sub-cell B1, and the protrusion member L2 arranged in the sub-cell B2 are seen. Since the protrusion member L0 arranged in the sub-cell B0 is formed parallel to the azimuth angle ϕ0, a thickness portion of the protrusion member L0 is observed, and thus, it is considered that the influence of the color of the protrusion member L0 on the visibility of the content is limited.

However, the protrusion member L1 arranged in the sub-cell B1 and the protrusion member L2 arranged in the sub-cell B2 are formed such that a longitudinal direction intersects with the azimuth angle ϕ0, and thus, the color of the tinted portion 4 in the sub-cell B1 and the sub-cell B2 is shielded by a wide surface. In a case where the unit cell C is observed from the direction of the azimuth angle ϕ0, the color of the wide surface of the protrusion member L1 and the protrusion member L2 greatly affects the visibility of the content.

The same applies to a case where the unit cell C is observed from other azimuth angles ϕ1 and ϕ2. The wide surface of the protrusion member orthogonal to the azimuth angle for observation greatly affects the visibility of the content.

First Embodiment

In a first embodiment, the protrusion member 3 is formed in gray that is an achromatic color. The protrusion member 3 may be formed of a gray member, or may be formed by tinting a member having a color other than gray with gray. The first embodiment is preferable for the display medium 1 in which the gray member can be formed as the protrusion member 3. Note that, in the embodiments of the invention, the achromatic color is gray excluding white and black.

The protrusion member 3 may be formed by being tinted with a plurality of colors that form an achromatic color by additive color mixing, or may be formed by connecting a member formed of the plurality of colors. For example, an upper surface of the protrusion member is segmented into a plurality of regions to which each color is applied when seen from a position facing the planar member 2, and is tinted such that different colors are applied to adjacent regions in a vertical direction and a horizontal direction, and the same color is applied to adjacent regions in an oblique direction. In a case where the protrusion member 3 is observed in a point-blank range, each of the colors can be distinctively checked, but in a case where the protrusion member 3 is observed from a separate location where the content displayed by the display medium 1 can be visually recognized, the protrusion member may appear in gray by the additive color mixing, specifically, in a color having a brightness higher than black.

Since the protrusion member 3 appears in gray, even in a case where the protrusion member 3 is visually recognized, a color phase of the content is not affected, and thus, the visibility of the content is not greatly decreased. Accordingly, the display medium 1 is capable of being consonant with arbitrary content without limiting the shade of the content.

Note that, in the first embodiment, as an example of the additive color mixing, a case of using juxtapositional additive color mixing is described, but the protrusion member 3 may be formed to appear in gray by additive color mixing other than the juxtapositional additive color mixing. For example, according to simultaneous additive color mixing, the protrusion member 3 may be formed in gray by irradiating the protrusion member 3 with a plurality of colors in an overlapping manner. In addition, in a case where the tinting of the protrusion member 3 can be changed in a time-division manner, the protrusion member may be formed to be recognized as gray in the human brain by successive additive color mixing.

Second Embodiment

In the first embodiment, a case has been described in which the gray member is formed as the protrusion member 3, but in a second embodiment, a case will be described in which the protrusion member 3 contains a UV (ultraviolet) curable ink sprayed by an ink jet printer.

The ink jet printer performs scanning on the planar member 2, tints the tinted portion 4, and forms the protrusion member 3. The ink jet printer tints the tinted portion 4 in accordance with a color value applied to each of the sub-cells that is calculated by the method described in Patent Document 1. The tinted portion 4 is formed of the color of the ink mounted on the ink jet printer or a color obtained by mixing inks.

In addition, the ink jet printer sprays a UV resin to the position of the protrusion member 3 to have a desired height. In a case where the UV resin is cured, a fine concavo-convex shape of the protrusion member 3 is formed on the planar member 2. In addition, the ink jet printer forms the protrusion member 3 to have light shielding properties, for example, to have a thickness of 0.005 mm or more.

In a case where the ink mounted on the ink jet printer is a gray ink, the ink jet printer forms the protrusion member 3 by mixing the UV ink and the gray ink. Accordingly, it is possible to form the display medium 1 that is capable of being consonant with arbitrary content without limiting the shade of the content.

However, there are many cases in which inks of cyan (C), magenta (M), and yellow (Y) are mounted on a general ink jet printer, but a gray ink is not mounted. Examples of a method for forming an intermediate color such as gray that is different from the color of the ink mounted on the ink jet printer include half toning and contoning. The half toning is expressed by a dither pattern or an error diffusion, and thus, in principle, is not capable of being used in the protrusion member. In the contoning, colors are controlled in an overlapping manner, and thus, a height may be different in accordance with an intermediate color, and a protrusion member having an even height is not capable of being formed. Accordingly, it is not possible to form the protrusion member 3 by a general method for a printer to form an intermediate color.

In the second embodiment, a method for an ink jet printer of CMY or the like to form the protrusion member 3 that is capable of being consonant with arbitrary content by using an ink mounted on the printer will be described. In the second embodiment, the protrusion member 3 is tinted with the plurality of colors that form the achromatic color by the additive color mixing. In the protrusion member 3 formed as described above, each color that is tinted on the protrusion member 3 can be checked in a close position, but in a position where the protrusion member can be visually recognized by the additive color mixing, the color of the protrusion member 3 is an achromatic color, specifically, a color having a brightness higher than black. Accordingly, the color of the protrusion member 3 does not affect the color phase of the color of the content.

Each of the plurality of colors tinted on the protrusion member 3 is a primary color of the ink used in the ink jet printer. Each of the colors configuring the plurality of colors may be the color of the ink mounted on the ink jet printer. In the embodiments of the invention, a case will be described in which the inks mounted on the general ink jet printer are CMY. The colors configuring the plurality of colors may be a combination of other colors such as RGB. In a case where the protrusion member 3 is formed by color mixing of the inks mounted on the ink jet printer, the brightness of the protrusion member 3 is reduced by the color mixing. Therefore, the primary colors of the inks mounted on the ink jet printer are combined, and the protrusion member 3 is tinted with the achromatic color by the additive color mixing, and thus, the height of the protrusion member 3 can be even, and a reduction of the brightness of the protrusion member 3 due to the color mixing can be avoided.

The ink jet printer independently sprays each of the inks mounted on the printer to each of adjacent fine regions without mixing the inks. Accordingly, in the point-blank range where the color of each of the inks can be distinctively visually recognized, each color of CMY can be discriminated, but in a separate position where the additive color mixing is available, CMY are mixed to gray. The display medium 1 is formed such that in the point-blank range, each color of CMY can be discriminated, and in a position where the content is visually recognized, the additive color mixing occurs, and thus, the display medium 1 can be consonant with arbitrary content without limiting the shade of the content.

Note that, in the second embodiment, a case will be described in which the juxtapositional additive color mixing is used as an example of the additive color mixing, but the protrusion member 3 may be formed to appear in gray by additive color mixing other than the juxtapositional additive color mixing. For example, according to the simultaneous additive color mixing, the protrusion member 3 may be formed in gray by irradiating the protrusion member 3 with the plurality of colors in an overlapping manner. In addition, in a case where the tinting of the protrusion member 3 can be changed in a time-division manner, the protrusion member may be formed to be recognized as gray in the human brain by the successive additive color mixing.

The upper surface of the protrusion member 3 is segmented into the plurality of regions to which each color is applied when the display medium 1 is seen from the position (the above) facing the planar member 2, and each color of CMY is applied to each of the regions. The upper surface of each of the protrusion members 3 provided in each of the cells is segmented into the plurality of regions when the display medium 1 is seen from the upper surface, and each of the regions is tinted with the color of the ink mounted on the ink jet printer. The regions segmented on the upper surface of the protrusion member 3 may be the same unit cell C, or may be different unit cells. For example, one color may be applied to the unit cell C, one color may be applied to a plurality of unit cells C, or a plurality of colors may be applied to one unit cell C.

The same color is applied in the perpendicular direction from a rising portion of the planar member 2 to the upper surface of the protrusion member 3. In each color of CMY, it is sufficient that the protrusion member 3 appears in gray by the additive color mixing when displaying the content, and the arrangement of each color of CMY is not limited.

For example, there is a method for segmenting the protrusion member 3 into the shape of a horizontal stripe in the top view and for tinting the protrusion member with each color of CMY. In each coordinate system illustrated in FIG. 1(b) and FIG. 2(b), an X-axis direction of the protrusion member 3 is not segmented but a Y-axis direction is segmented into a plurality of regions, and thus, the plurality of regions in which the X-axis direction is a longitudinal direction are formed in the Y-axis direction. Each of the plurality of regions is tinted with any color of CMY. The color applied to the upper surface of the protrusion member 3 is tinted perpendicular to a Z-axis direction up to the planar member 2. Specifically, in the example illustrated in FIG. 2(b), in a case where a YZ flat surface of the cell C is visually recognized from the left side of the X-axis direction, a lateral surface of the protrusion member L1 is tinted with CMY in this order into the shape of a vertical stripe, and in a case where an XZ flat surface of the cell C is visually recognized from the near side of the Y-axis direction, any color of CMY is tinted on one surface.

For example, there is a method for segmenting the protrusion member 3 into the shape of a vertical stripe in the top view and for tinting the protrusion member with each color of CMY. In each coordinate system illustrated in FIG. 1(b) and FIG. 2(b), the X-axis direction of the protrusion member 3 is segmented into a plurality of regions but the Y-axis direction is not segmented, and thus, the plurality of regions in which the Y-axis direction is the longitudinal direction are formed in the X-axis direction. Each of the plurality of regions is tinted with any color of CMY. The color applied to the upper surface of the protrusion member 3 is tinted perpendicular to the Z-axis direction up to the planar member 2. Specifically, in the example illustrated in FIG. 1(a), in a case where the YZ flat surface of the cell C is visually recognized from the left side of the X-axis direction, any color of CMY tinted on one surface, and in a case where the XZ flat surface of the cell C is visually recognized from the near side of the Y-axis direction, the lateral surface of the protrusion member 3 is tinted with CMY in this order into the shape of a vertical stripe.

In addition, there is a method for segmenting the protrusion member 3 into the shape of an oblique stripe in the top view and for tinting the protrusion member with each color of CMY. In each coordinate system illustrated in FIG. 1(b) and FIG. 2(b), the X-axis direction and the Y-axis direction of the protrusion member 3 are segmented into a plurality of regions, and the regions are formed in the oblique direction, and thus, the plurality of regions in which the oblique direction is the longitudinal direction are formed on an XY flat surface. Each of the plurality of regions is tinted with any color of CMY. The color applied to the upper surface of the protrusion member 3 is tinted perpendicular to the Z-axis direction up to the planar member 2. Specifically, in the example illustrated in FIG. 1(a), in a case where the YZ flat surface of the cell C is visually recognized from the left side of the X-axis direction, the lateral surface of the protrusion member 3 is tinted with CMY in this order into the shape of a vertical stripe, and in a case where the XZ flat surface of the cell C is visually recognized from the near side of the Y-axis direction, the lateral surface of the protrusion member 3 is tinted with CMY in this order into the shape of a vertical stripe.

In addition, there is a method for segmenting the protrusion member 3 into lattice-shaped regions in the top view and for tinting the protrusion member with each color of CMY. In each coordinate system illustrated in FIG. 1(b) and FIG. 2(b), each of the X-axis direction and the Y-axis direction of the protrusion member 3 is segmented into a plurality of regions, and thus, the plurality of regions are formed in which a plurality of rectangles are arranged into the shape of a lattice. The color applied to the upper surface of the protrusion member 3 is tinted perpendicular to the Z-axis direction up to the tinted portion 4. Specifically, in the example illustrated in FIG. 1(a), in a case where the YZ flat surface of the cell C is visually recognized from the left side of the X-axis direction, the lateral surface of the protrusion member is tinted with CMY in this order into the shape of a vertical stripe, and in a case where the XZ flat surface of the cell C is visually recognized from the near side of the Y-axis direction, the lateral surface of the protrusion member L is tinted with CMY in this order into the shape of a vertical stripe.

Figure 3:
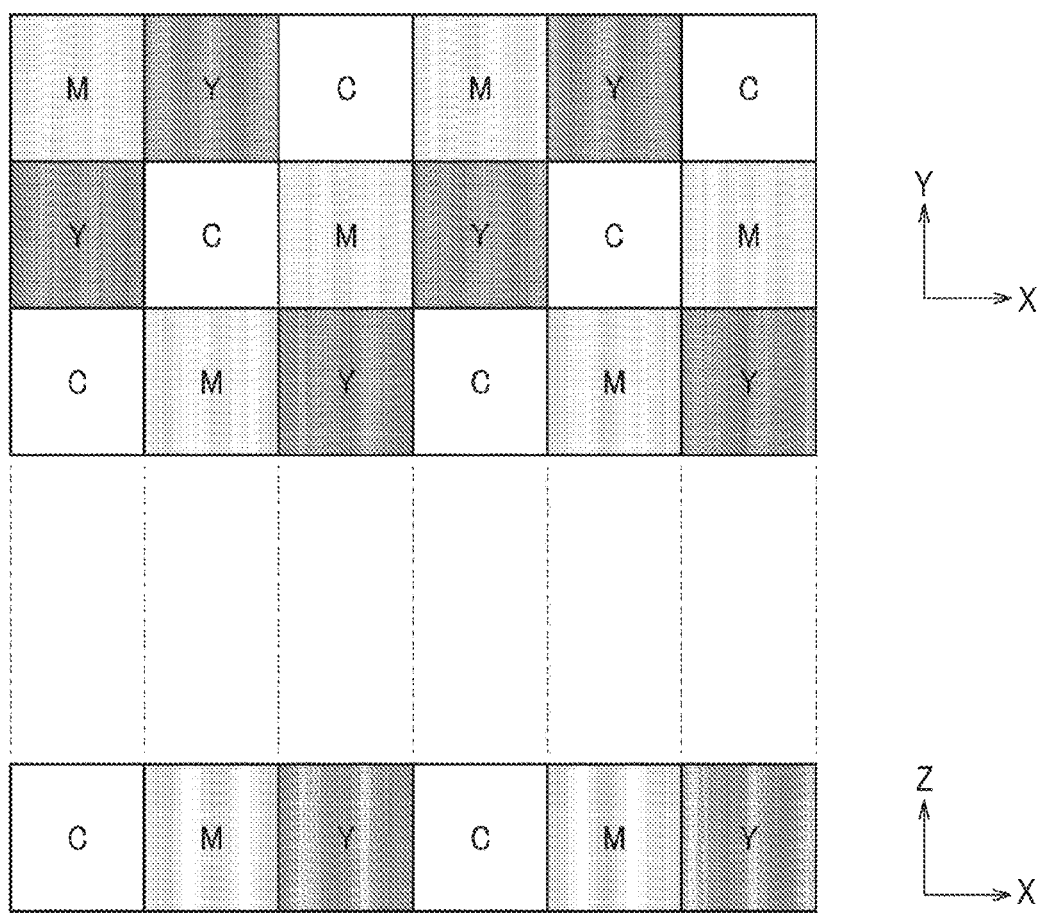
FIG. 3 is an example of a color to be assigned to the protrusion member in the top view of the display medium.

In this case, in the protrusion member 3, as illustrated in FIG. 3, it is preferable that in the top view, different colors are applied to the adjacent regions in the vertical direction and the horizontal direction, and the same color is applied to the adjacent regions in the oblique direction. The upper drawing in FIG. 3 illustrates a pattern of the colors that are applied to the protrusion member 3 in the top view of the display medium 1. The lower drawing illustrates a pattern of the colors that are applied to the protrusion member 3 in the side view of the display medium 1. Note that, in FIG. 3 and FIG. 4, white represents cyan (C), light gray represents magenta (M), and dark gray represents yellow (Y).

In an example illustrated in FIG. 3, the region of each color of CMY is arranged in an oblique direction of 45 degrees, and CMY are repeatedly arranged in both of the X-axis direction and the Y-axis direction. In the pattern illustrated in FIG. 3, CMY are arranged adjacent to the surrounding rectangle in any rectangle in any position, and thus, in a case where the display medium 1 is checked from a position in which the additive color mixing occurs, the achromatic color is evenly formed. The pattern as illustrated in FIG. 3 does not depend on the direction of the protrusion member 3, in other words, a direction in which the display medium 1 displays the content, and thus, can be applied to an arbitrary display medium 1.

In the display medium 1, one region obtained by segmenting the upper surface of the protrusion member 3 in the top view is formed by a plurality of times of spray of the ink jet printer. In general, the UV curable ink is liquid until being cured, and thus, easily spreads when only one dot is independently ejected, and may not be capable of forming a desired height. In addition, in general, in a case of ejecting inks of different colors adjacent to each other, the inks are mixed, and the color becomes cloudy, and thus, the color is not capable of being controlled in a dot unit. Note that, the dot is a printing surface that is formed by one spray of the ink jet printer.

Therefore, each of the region includes a plurality of dots, and thus, it is possible to prevent the UV curable ink from spreading and the colors from being mixed, and it is possible to form the protrusion member 3 having a desired height of a desired color.

In addition, each of the regions includes the plurality of dots, and thus, a case is considered in which color mixing occurs in a boundary portion between different colors, but it is possible to secure a dot portion in which the color mixing does not occur. For example, in a case where one region includes 10 dots×10 dots, in the X-axis direction passing through the center of the region, two dots on both ends are adjacent to the regions to which different colors are applied, and thus, the color mixing occurs, but in eights dots other than the two dots, the color mixing is less likely occur. In a portion in which different colors are adjacent to each other, the color mixing occurs, but in a portion in which the same colors are adjacent to each other, the color mixing does not occur, and thus, a reduction of the brightness due to the color mixing can be suppressed.

Note that, the number of dots configuring each of the regions is set to make an effect that the UV curable ink does not spread and the colors are not mixed and an effect that the achromatic color is obtained by the additive color mixing with the color in the surrounding region compatible.

Note that, in the embodiments of the invention, a case has been described in which the segment of the color that is applied to the upper surface of the protrusion member 3 is a rectangle in the top view of the display medium 1, but the invention is not limited thereto. When referring to the display medium 1 from each position where the content displayed by the display medium 1 is visually recognized, it is sufficient that the protrusion member 3 is the achromatic color, and each color may not be in the same shape. It is preferable that the protrusion member 3 is tinted with any ink mounted on the ink jet printer without omission, and each color has the same area. In addition, a case has been described in which a combination of colors that form an achromatic color is three colors of CMY, but the combination may be a combination of four or more primary colors of inks mounted on the ink jet printer.

Figure 4:
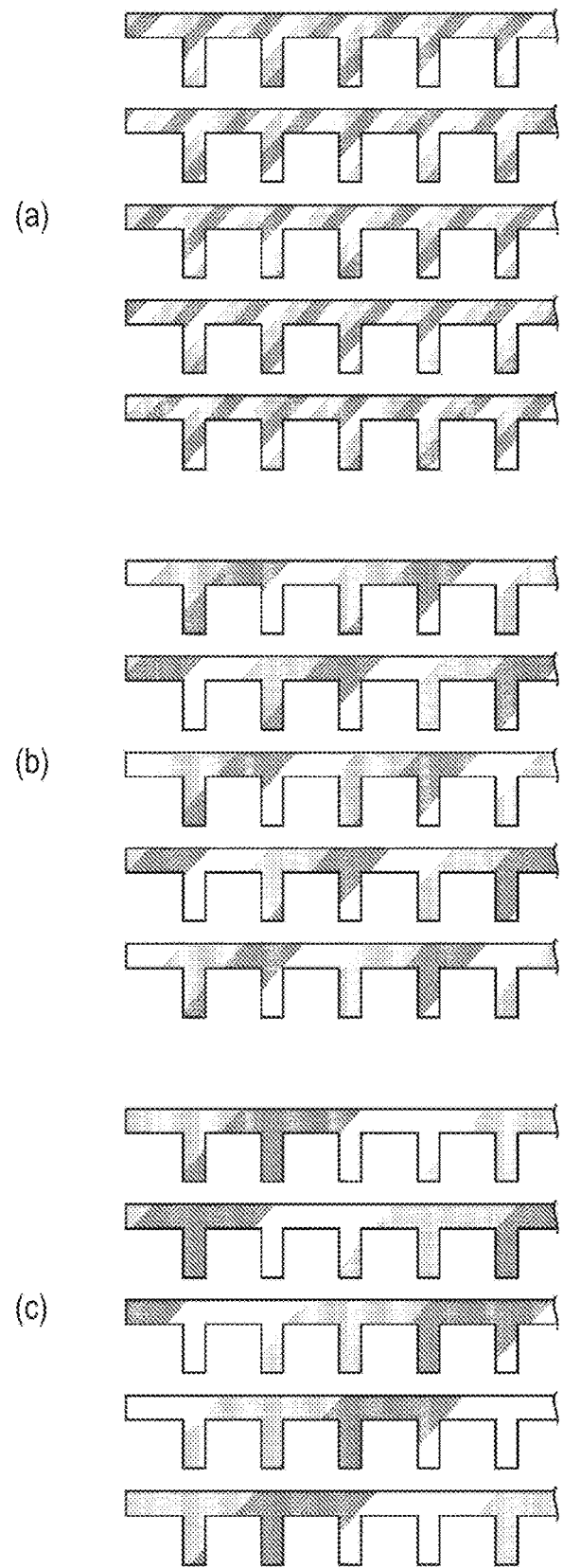
FIG. 4(a) is an example of the color to be assigned to the protrusion member in the top view of the display medium when a particle size of a region is small.
FIG. 4(b) is an example of the color to be assigned to the protrusion member in the top view of the display medium when a particle size of a region is medium.
FIG. 4(c) is an example of the color to be assigned to the protrusion member in the top view of the display medium when a particle size of a region is large.
Figure 5:
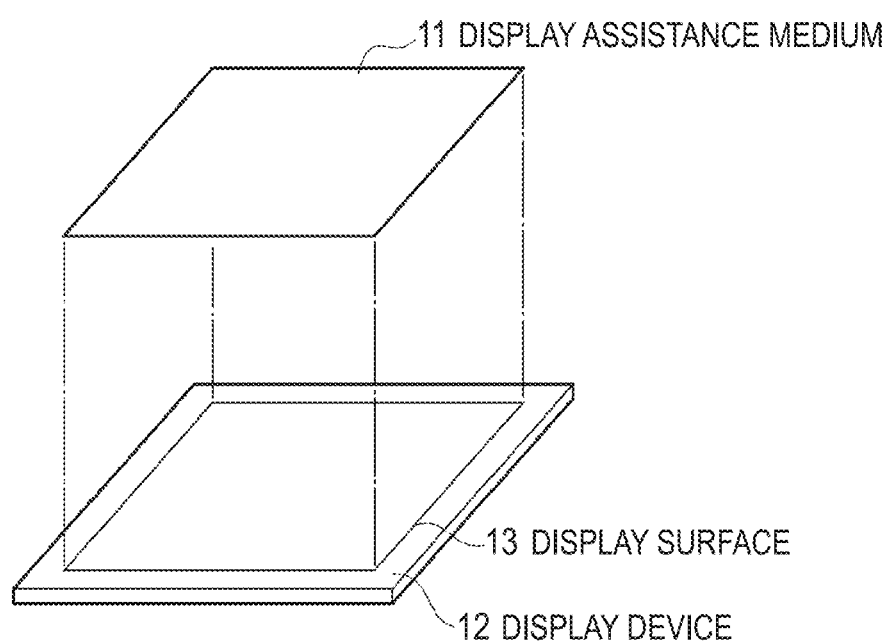
FIG. 5 is a diagram illustrating a display assistance medium according to a third embodiment.

An example in which the protrusion member 3 is tinted will be described with reference to FIG. 4. In the display medium 1 illustrated in FIG. 4, the unit cells C are arranged in 5×5, and the T-shaped protrusion member 3 is formed in each of the cells. In order of FIG. 4(a), FIG. 4(b), and FIG. 4(c), a particle size of the region (rectangle) formed on the upper surface of the protrusion member 3 gradually increases. In FIG. 4, in the top view, the regions of the same color are provided in the oblique direction of 45 degrees.

In the top view of the display medium 1, as the particle size of each of the regions is coarse, a shadow is likely to be seen in a direction of the same color of the region, and as the particle size is fine, a shadow is less likely to be seen in the direction of the same color of the region. The particle size of each of the regions may be set in accordance with the content displayed by the display medium 1 or the like.

According to the findings of the inventors, in the display medium 1 according to the second embodiment, the visibility of the content is improved, compared to a display medium in which the protrusion member 3 is formed in black.

Third Embodiment

In the first embodiment and the second embodiment, a case of forming the display medium 1 in which the tinted portion 4 and the protrusion member 3 appearing in the achromatic color are provided on the planar member 2 has been described, but the invention can be attained in other aspects.

In a third embodiment, as illustrated in FIG. 9, a display assistance medium 11 in which the protrusion member 3 described above is formed on a sheet-shaped member that has a sheet shape and transmits light is pasted to a display surface 13 of a general display device 12 for reflecting light. The display device 12 displays an image in which the color of each of the sub-cells is determined in accordance with the shape of the unit cell C, the sub-cell B, and the protrusion member 3 that are formed in the display assistance medium 11. In other words, the display device 12 electrically attains the tinted portion 4 according to the first embodiment and the second embodiment.

Accordingly, as with the embodiments of the invention, different content items can be observed from the azimuth angles, respectively. The sheet-shaped member that is used in the display assistance medium 11 may be formed of a transparent member that transmits light, or may be formed to transmit a part of light within a range not affecting the visibility of the observer. Here, the display device 12 is a liquid crystal display, an organic EL display, or the like, and is preferably a display using a bright backlight or a bright light emitting element.

The display assistance medium 11 according to the third embodiment is preferable in a case of displaying arbitrary different images in accordance with the azimuth angle. The display assistance medium 11, for example, is capable of displaying information according to the position of each observer and other conditions with respect to a plurality of observers observing the display assistance medium 11 pasted to the display device 12 from different directions.

In the third embodiment, the protrusion member 3 that is formed in the sheet-shaped member, as described in the first embodiment or the second embodiment, may be formed in gray, or may be tinted with the plurality of colors that form the achromatic color by the additive color mixing.

In addition, it is preferable that when the display assistance medium 11 forms the protrusion member 3 in the clear sheet-shaped member with the UV curable ink sprayed by the ink jet printer, each of the plurality of colors that are tinted on the protrusion member 3 is the primary color of the ink used in the ink jet printer. In addition, it is preferable that the upper surface of the protrusion member 3 is segmented into the plurality of regions to which each color is applied when seen from a position facing the sheet-shaped member, different colors are applied to the adjacent regions in the vertical direction and the horizontal direction, and the same color is applied to the adjacent regions in the oblique direction. Further, it is preferable that such regions are formed by a plurality of times of spray of the ink jet printer.

The display device 12 is capable of displaying an arbitrary image, and thus, is capable of displaying a suitably image in accordance with an arbitrary condition. In addition, the display device 12 consecutively changes the image, and thus, different video content items can be observed from the azimuth angles, respectively. The display assistance medium 11 in which the protrusion member 3 that is formed in gray, or is tinted with the plurality of colors that form the achromatic color by the additive color mixing is pasted to such a display device 12, and thus, the display assistance medium 11 can be consonant with arbitrary content without affecting the color phase of the content displayed by the display device 12.

Note that, since the pixel of the image displayed by the display device 12 corresponds to the sub-cell formed in the display assistance medium 11, the display assistance medium 11 is suitably positioned to be suitably pasted to the display surface 13.

(Processing Device)

A processing device 100 according to the embodiments of the invention will be described with reference to FIG. 6. The processing device 100 is a general computer including a memory device 110, a processing control device 120, and an input/output interface 130. The general computer executes a processing program, and thus, functions illustrated in FIG. 6 are attained.

Figure 6:
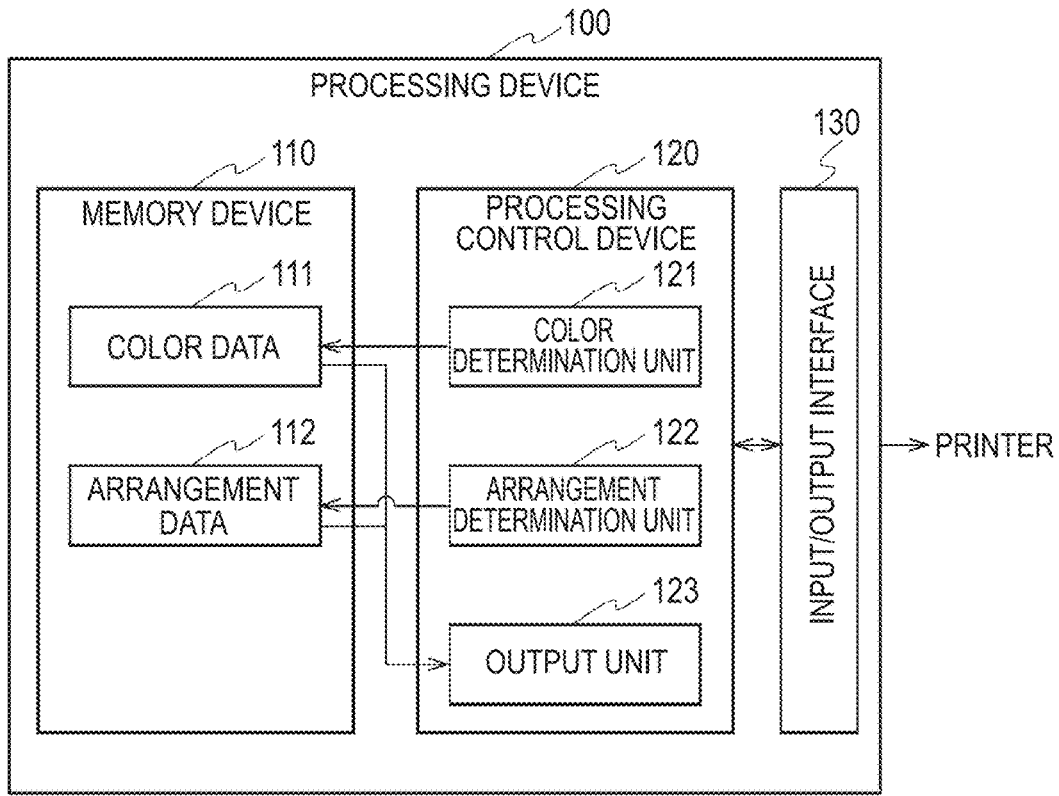
FIG. 6 is a diagram illustrating a hardware configuration and a functional block of a processing device used for forming the display medium or the display assistance medium according to the embodiments of the invention.

The processing device 100 illustrated in FIG. 6 determines the combination of the colors or the arrangement of the colors when combining the plurality of colors to tint the protrusion member 3 by the additive color mixing. The processing device 100 is used by the ink jet printer to manufacture the display medium 1 according to the second embodiment or the display assistance medium 11 according to the third embodiment.

The memory device 110 is a read only memory (ROM), a random access memory (RAM), a hard disk, a solid state drive (SSD), or the like, and stores various data pieces such as input data, output data, and intermediate data for the processing control device 120 to execute processing. The processing control device 120 is a central processing unit (CPU), and executes the processing in the processing device 100 by reading and writing the data stored in the memory device 110 or by inputting and outputting the data with respect to the input/output interface 130. The input/output interface 130 inputs a processing result of the processing device 100 to the ink jet printer. The ink jet printer forms the protrusion member 3 of the display medium 1, with reference to the result obtained from the processing device 100.

The memory device 110 stores the processing program, and stores color data 111 and arrangement data 112. The color data 111 is a color determined by a color determination unit 121, and is data for specifying the combination of the colors that form the achromatic color by the additive color mixing. The arrangement data 112 is the arrangement of colors that is determined by an arrangement determination unit 122, and is data for specifying the size of the regions in which the same color is arranged and the arrangement of the colors that form the achromatic color by the additive color mixing. The processing program can also be stored in a computer-readable recording medium such as a HDD, a SSD, a universal serial bus (USB) memory, a compact disc (CD), and a digital versatile disc (DVD), or can also be distributed through a network.

The processing control device 120 includes the color determination unit 121, the arrangement determination unit 122, and an output unit 123.

The color determination unit 121 determines the combination of the colors in which the protrusion member 3 forms the achromatic color by the additive color mixing. For example, in a case where each ink of CMY is mounted on the ink jet printer, the color determination unit 121 determines CMY as the combination of the colors that form the achromatic color by the additive color mixing. In a case where inks of other colors are mounted on the ink jet printer, the color determination unit 121 determines a combination of primary colors of inks that can be mounted on the ink jet printer, which is the combination of the colors that form the achromatic color by the additive color mixing.

The color determination unit 121 outputs the determined combination of the colors as the color data 111.

The arrangement determination unit 122 determines the arrangement of the colors that form the achromatic color by the additive color mixing such that the protrusion member 3 appears in the achromatic color. The arrangement determination unit 122 determines the size of the region in which one color is formed on the upper surface of the protrusion member 3. In a case where the size of the region is large, the influence of the color mixing in adjacent portions of the region is small, but a shadow linked to the color applied to the region is likely to be seen, and in a case where the size of the region is small, the influence of the color mixing in the adjacent portions of the region is large, but the shadow linked to the color applied to the region is less likely to be seen. The arrangement determination unit 122 may determine the size of the region in which one color is formed, in accordance with the content to be displayed.

The arrangement determination unit 122 further determines the color of each of the regions. The arrangement determination unit 122, in the top view, determines the arrangement of each of the colors that form the achromatic color by the additive color mixing to have a prescribed shape such as a vertical stripe shape or a horizontal stripe shape. The arrangement determination unit 122, in the top view, for example, as illustrated in FIG. 3, determines the arrangement of each of the colors that form the achromatic color by the additive color mixing such that different colors are applied to the adjacent regions in the vertical direction and the horizontal direction, and the same color is applied to the adjacent regions in the oblique direction.

The arrangement determination unit 122 outputs the size of the regions in which the same color is arranged, and the arrangement of the colors that form the achromatic color by the additive color mixing, as the arrangement data 112.

The output unit 123 inputs data for the ink jet printer to be capable of forming the protrusion member 3 to the ink jet printer. The output unit 123 outputs the color data 111 output by the color determination unit 121, or the arrangement data output by the arrangement determination unit 122. The output unit 123 may output the color data 111 output by the color determination unit 121, and the arrangement data 112 output by the arrangement determination unit 122.

Figure 7:
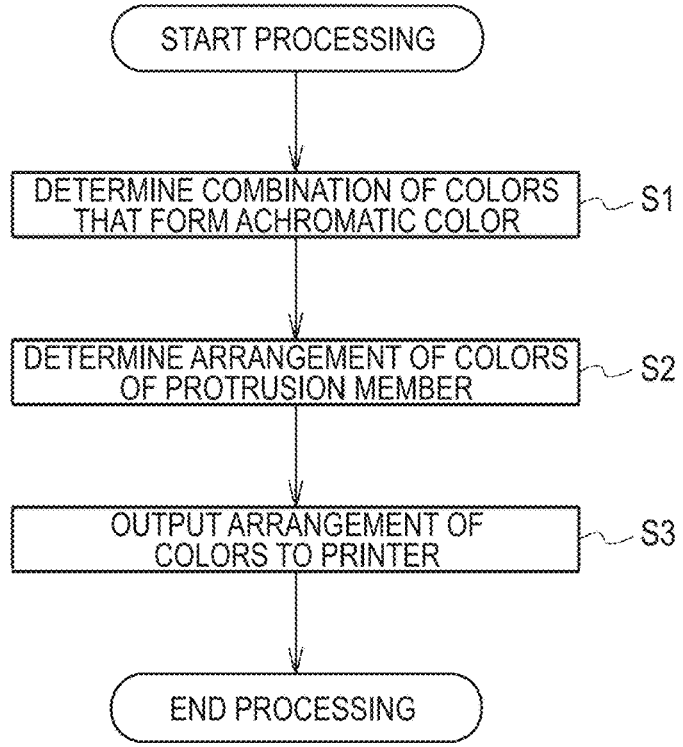
FIG. 7 is a flowchart illustrating processing according to the embodiments of the invention.

A processing method using the processing device 100 will be described with reference to FIG. 7.

First, in step S1, the processing device 100 determines the combination of the colors that form the achromatic color. In step S2, the processing device 100 determines the arrangement of the colors to be tinted on the protrusion member 3 with respect to the combination of the colors that is determined in step S1. In step S3, the processing device 100 outputs the arrangement of the colors that is determined in step S2 to the ink jet printer.

Such a processing device 100 is capable of outputting data for manufacturing the display medium 1 according to the second embodiment or the display assistance medium 11 according to the third embodiment.

In addition, a case has been described in which the color data 111 and the arrangement data 112 generated by the processing device 100 are input to the ink jet printer, but the invention is not limited thereto. The color data and the arrangement data may be used as design data for designing the arrangement of colors when forming the protrusion member 3 by combining a member having a prescribed color, such as a case where the display medium 1 has a size that is not capable of being formed by the ink jet printer.

Other Embodiments

As described above, the embodiments of the invention have been described, but the discussion and the drawings configuring a part of the disclosure should not be construed as limiting the invention. Various alternative embodiments, examples, and operation technologies are obvious for a person skilled in the art from the disclosure.

For example, the processing device described in the embodiments of the invention, as illustrated in FIG. 1, may be configured on one hardware, or may be configured on a plurality of hardwares in accordance with the number of functions or processings thereof. In addition, the processing device may be attained on the existing processing system.

It is obvious that the invention includes various embodiments and the like that are not described herein. Accordingly, the technical scope of the invention is defined only by the matters used to specify the invention according to the claims that are valid from the above description.

REFERENCE SIGNS LIST

1 Display medium
2 Planar member
3 Protrusion member
4 Tinted portion
11 Display assistance medium
12 Display device
100 Processing device
110 Memory device
111 Color data
112 Arrangement data
120 Processing control device
121 Color determination unit
122 Arrangement determination unit
C Unit cell

The invention claimed is:

1. A display medium capable of displaying a prescribed number of content items corresponding to a prescribed number of azimuth angles from prescribed elevation and azimuth angles, the medium comprising:
   a planar member for reflecting light,
   wherein the planar member is segmented into a plurality of unit cells,
   each of the plurality of unit cells is segmented into a prescribed number of sub-cells corresponding to the prescribed number of azimuth angles,
   a protrusion member that has a light-shielding surface, parallel to the prescribed azimuth angle on the planar member, is formed in each sub-cell corresponding to the prescribed azimuth angle, and
   the protrusion member is tinted with a plurality of colors that form an achromatic color by additive color mixing.

2. The display medium according to claim 1, wherein an upper surface of the protrusion member is segmented into a plurality of regions to which each color is applied when seen from a position facing the planar member, and
   different colors are applied to adjacent regions in a vertical direction and a horizontal direction, and the same color is applied to adjacent regions in an oblique direction.

3. The display medium according to claim 2, wherein the upper surface of the protrusion member is segmented into the plurality of regions to which each color is applied when seen from the position facing the planar member, and
   the region is formed by a plurality of times of spray of an ink jet printer.

4. The display medium according to claim 1, wherein when the protrusion member contains a UV curable ink sprayed by an ink jet printer, and
   each of the plurality of colors tinted on the protrusion member is a primary color of the ink that is used in the ink jet printer.

5. A processing device used for manufacturing the display medium according to claim 1, the device comprising:
   a color determination unit for determining a combination of colors in which the protrusion member forms an achromatic color by additive color mixing.

6. A processing program allowing a computer to function as the processing device according to claim 5.

7. A processing device used for manufacturing the display medium according to claim 1, the device comprising:
   an arrangement determination unit for determining arrangement of colors that form an achromatic color by additive color mixing such that the protrusion member appears in the achromatic color.

8. A processing program allowing a computer to function as the processing device according to claim 7.

9. A display assistance medium capable of being pasted to a display surface that has a flat surface for reflecting light and of displaying a prescribed number of content items corresponding to a prescribed number of azimuth angles from prescribed elevation and azimuth angles, the medium comprising:
   a sheet-shaped member that has a sheet shape and transmits light,
   wherein the sheet-shaped member is segmented into a plurality of unit cells,
   each of the plurality of unit cells is segmented into a prescribed number of sub-cells corresponding to the prescribed number of azimuth angles,
   a protrusion member that has a light-shielding surface, parallel to the prescribed azimuth angle on the sheet-shaped member, is formed in each sub-cell corresponding to the prescribed azimuth angle, and
   the protrusion member is tinted with a plurality of colors that form an achromatic color by additive color mixing.

10. The display assistance of claim 9, wherein the protrusion member is formed in gray.

11. A processing device used for manufacturing the display medium according to claim 10, the device comprising:
   a color determination unit for determining a combination of colors in which the protrusion member forms an achromatic color by additive color mixing.

12. A processing device used for manufacturing the display medium according to claim 10, the device comprising:
   an arrangement determination unit for determining arrangement of colors that form an achromatic color by additive color mixing such that the protrusion member appears in the achromatic color.

13. A processing device used for manufacturing the display medium according to claim 9, the device comprising:
   a color determination unit for determining a combination of colors in which the protrusion member forms an achromatic color by additive color mixing.

14. A processing device used for manufacturing the display medium according to claim 9, the device comprising:
   an arrangement determination unit for determining arrangement of colors that form an achromatic color by additive color mixing such that the protrusion member appears in the achromatic color.

* * * * *